(12) United States Patent
Zadikario et al.

(10) Patent No.: US 8,533,321 B2
(45) Date of Patent: *Sep. 10, 2013

(54) METHOD AND SYSTEM FOR TRACKING A CUMULATIVE NUMBER OF IDENTIFIABLE VISITORS TO DIFFERENT OBJECTS

(75) Inventors: Ofer Zadikario, Ra'anana (IL); Hanit Galili, Kfar Saba (IL); Efraeim Cohen-Kassko, Herzliya (IL); Amichai Kidron, Givat-Shmuel (IL); Keren Friedman, Ramat Hasharon (IL); Inbal Cohen-Shwartz, Kadima (IL)

(73) Assignee: Mediamind Technologies Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,219

(22) Filed: Mar. 5, 2012

(65) Prior Publication Data
US 2012/0166273 A1    Jun. 28, 2012

Related U.S. Application Data

(63) Continuation of application No. 11/641,062, filed on Dec. 19, 2006, now Pat. No. 8,156,218.

(51) Int. Cl.
*G06F 15/173* (2006.01)

(52) U.S. Cl.
USPC .................. 709/224; 709/225; 709/226

(58) Field of Classification Search
None
See application file for complete search history.

(56) References Cited

U.S. PATENT DOCUMENTS

| | | |
|---|---|---|
| 7,085,682 B1 | 8/2006 | Heller et al. |
| 2002/0082901 A1 | 6/2002 | Dunning et al. |
| 2002/0116494 A1* | 8/2002 | Kocol ........................... 709/224 |
| 2003/0115586 A1 | 6/2003 | Lejouan et al. |
| 2005/0021440 A1 | 1/2005 | Dresden |
| 2005/0021731 A1* | 1/2005 | Sehm et al. ................... 709/224 |
| 2005/0125354 A1 | 6/2005 | Pisaris-Henderson et al. |
| 2007/0027771 A1 | 2/2007 | Collins et al. |
| 2008/0004937 A1 | 1/2008 | Chow et al. |

FOREIGN PATENT DOCUMENTS

WO    01/33831    5/2001

* cited by examiner

*Primary Examiner* — Umar Cheema
(74) *Attorney, Agent, or Firm* — Myers Wolin, LLC

(57) ABSTRACT

A method for tracking a cumulative number of unique visitors to different to objects. The method includes maintaining a data structure that allows for a direct determination of the cumulative number of different visitors exposed to the different objects; establishing a connection with a visitor when the visitor requests to visit an object; examining a cookie stored in the visitor during the established connection to determine whether the visitor previously visited the currently requested object; and updating the data structure in the database and an overlap code contained in the cookie based on the examination results, wherein objects are different websites displaying a same set of advertisements of a same campaign.

18 Claims, 4 Drawing Sheets

METHOD AND SYSTEM FOR TRACKING A CUMULATIVE NUMBER OF IDENTIFIABLE VISITORS TO DIFFERENT OBJECTS

CROSS-REFERENCE TO RELATED APPLICATIONS

The present application is a continuation application of U.S. patent application Ser. No. 11/641,062 filed Dec. 19, 2006, now allowed, the contents of which are incorporated herein by reference in their entirety.

FIELD OF THE INVENTION

This invention relates generally to the need to compute the total number of different visitors to objects, such as events, shops, journals, and the like. In particular, it relates to a method for tracking a cumulative number of identifiable visitors to different websites.

BACKGROUND OF THE INVENTION

There are many products and services where actions are conditioned on an aggregate total of events. For example, special offers and bonuses may be given based on an accumulated amount spent. Likewise, the rank of an item in a given hierarchy may be based on its relative popularity as measured by a number of visitors or purchasers and the like. When a desired action pertains to only one specific customer, for example a frequent flyer eligible for free flight tickets, it is straightforward to define a database structure where cumulative ticket price is stored for each member of the frequent flyers' club so as to allow bonuses to be awarded when a member's cumulative ticket price exceeds a predetermined threshold.

It is more difficult to aggregate scores when the scores themselves are aggregates to which more than one item or user contributes. For example, US2003115586 (Lejouan et al.) discloses a method for measuring and analyzing activity of multiple terminals on a data communications network. Data exchanged over the communications network by the terminals is stored in a database for subsequent analysis. Thus data comprising at least descriptive data of each packet transmitted and received by each terminal, is collected and transmitted to a central server where aggregate databases are generated to supply data representing the activity of a panel of equipment items connected to the communications network. This allows actions to be taken based on aggregate behavior of a target audience.

In a typical Internet scenario, an advertisement is displayed on a number of different websites so that users who enter some or all of these websites are repeatedly exposed to that advertisement. In order to determine a single website that serves as the most effective vehicle for disseminating the advertisement, it is only necessary to survey and count the number of users surfing each website.

WO0133831 (Peroff et al) discloses an interactive web-based survey instrument and method that allows the application of different selection criteria to be applied at a subscriber website as a survey participant. Selection criteria may be applied at a subscriber website that is visited, such as random or periodic selection of visiting users. Moreover, the user's activities at the subscriber site may be monitored, such as number of web pages viewed, time spent viewing and so forth.

US2002082901 (Doron et al.) discloses a system and method for discovering relationships among items and for recommending items based on the discovered relationships. The recommendations are based on user profiles that take into account actual preferences of users, without requiring users to complete questionnaires.

US2005021440 (Dresden) provides a virtual system that assists in the procurement of advertising on an Internet vendor site for the sale of products or services. The system links to a user's financial package to get data on the products or services and allows the user to set financial parameters based on the desired financial goals related to the product and advertising. Performance data regarding advertising is accessed and financial rules generated which are applied to generate a target price for advertising or one or more products. The system can acquire advertising automatically or assist in the submission of bids in an auction of advertising.

But frequently advertisers run campaigns where an advertisement is accessible from multiple websites and they want to know which combination of websites is the most effective vehicle for disseminating the advertisement. This information cannot be derived merely from the cumulative numbers of users surfing each website since frequently the same user will see the advertisement several times on different websites. So what really interests the advertiser is whether some of the websites are practically redundant such that not displaying the advertisement on one or more websites will not noticeably detract from the total number of unique surfers who are exposed to the advertisement.

To determine this it is not sufficient merely to count the number of exposures to each advertisement. It is necessary to identify each user surfing all websites that display the advertisement, to determine for each website of interest a list of unique surfers and to use this information to determine the most cost-effective combination of websites whereby maximum exposure is achieved for the least cost. Presently, collection of this data is implemented in the form of log lists with every log specifying "user x; visited site y". Such log lists require extensive processing to draw meaningful conclusions, thus requiring significant computation and computer resources such as memory and CPU time.

It would therefore be desirable to provide a simplified mechanism that allows the number of visitors to each website to be tracked in such a manner as to allow fast determination of the most effective combination of websites to produce a more cost-effective exposure of the campaign.

SUMMARY OF THE INVENTION

According to one aspect of the invention there is provided a computer-implemented method for tracking a cumulative number of identifiable visitors to different objects ($S_1, S_2 \ldots S_N$), each of which may be visited by multiple visitors, said method comprising:

maintaining a data structure adapted to contain records relating to each of said objects ($S_1, S_2 \ldots S_N$) and to each combination of two or more of said objects ($S_1S_2, S_1S_3, \ldots S_1S_N, S_2S_3, S_2S_4, \ldots S_2S_N, S_1S_2S_3, S_1S_3S_4, \ldots S_1S_{N-1}S_N$ etc.), for each visitor visiting an object ($S_M$) for the first time:
  (i) determining a current combination of objects previously visited by said visitor;
  (ii) if no objects have been previously visited by said visitor:
    a) if the data structure contains a record relating to said object ($S_M$), incrementing said record relating to said object ($S_M$; and b) if the data structure does not contain a record relating to said object ($S_M$), creating a record relating to said object ($S_M$) and setting said record to 1;

(iii) if objects have been visited by said visitor, decrementing the record relating to said current combination and:
 a) if the data structure contains a record relating to the combination of said object ($S_M$) with the current combination, incrementing said record relating to the combination of said object ($S_M$) with the current combination; and
 b) if the data structure does not contain a record relating to the combination of said object ($S_M$) with the current combination, creating a record relating to the combination of said object ($S_M$) with the current combination and setting said record to 1.

According to another aspect of the invention, order of visitation is important and the data structure is adapted to store records relating to each of said objects ($S_1, S_2 \ldots S_N$) and to each permutation of two or more of said objects ($S_1S_2, S_2S_1, S_1S_3, S_3S_1, \ldots S_1S_N, S_NS_1, S_2S_3, S_3S_2, S_2S_4, S_4S_2, \ldots S_2S_N, S_NS_2, S_1S_2S_3, S_1S_3S_2, \ldots S_1S_3S_4, \ldots S_1S_{N-1}S_N$ etc.), the method including:

for each visitor visiting an object ($S_M$) for the first time:
 (i) determining a current permutation of objects previously visited by said visitor that conforms to a specified visitation order;
 (ii) if no objects have been previously visited by said visitor:
  a) if the data structure contains a record relating to said object ($S_M$), incrementing said record relating to said object ($S_M$);
  b) if the data structure does not contain a record relating to said object ($S_M$), creating a record relating to said object ($S_M$) and setting said record to 1;
 (iii) if objects have been previously visited by said visitor in the specified visitation order, decrementing the record relating to said current permutation and:
  a) if the data structure contains a record relating to the permutation of said object ($S_M$) with the current permutation in the specified visitation order, incrementing said record; and
  b) if the data structure does not contain a record relating to the permutation of said object ($S_M$) with the current permutation in the specified visitation order, creating a record relating to the permutation of said object ($S_M$) with the current permutation in the specified visitation order and setting said record to 1.

BRIEF DESCRIPTION OF THE DRAWINGS

In order to understand the invention and to see how it may be carried out in practice, some embodiments will now be described, by way of non-limiting example only, with reference to the accompanying drawings, in which.

DETAILED DESCRIPTION OF EMBODIMENTS

Figure 1:
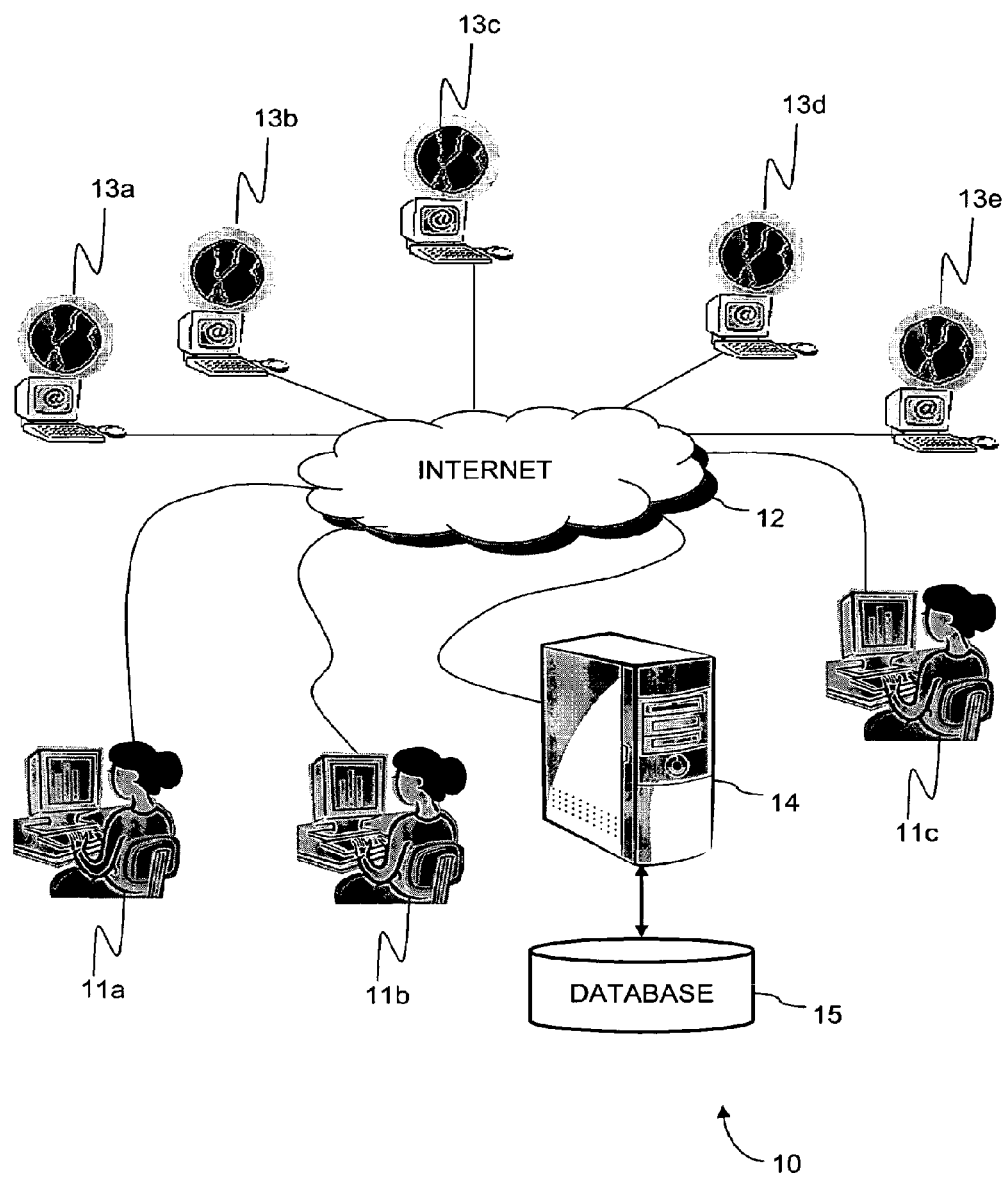
FIG. 1 is a pictorial representation of a system according to the invention.

FIG. 1 shows pictorially a system 10 wherein a plurality of web users 11a, 11b and 11c surf the Internet 12 so as to access websites 13a to 13e. An overlap server 14 to be described in more detail below is coupled to the Internet 12 and tracks all connections to any one of the websites 13a to 13e so as to detect and identify which of the web users 11a, 11b and 11c access each of the websites. To the extent that reference is made to the web users without regard to a specific one thereof, such web users will be referenced as 11. In a typical scenario an advertising agent sets up an ad campaign for a customer whereby a campaign is displayed on multiple host websites, such as yahoo.com, msn.com, aol.com and so on, so that when a web user 11 enters any of these host websites he or she is exposed to the campaign. It should be noted that while the invention is described with regard to an ad campaign, what is actually displayed is an advertisement and the host web page ultimately provides a link to that advertisement. Thus, reference to an ad campaign is not intended to be limiting in any way. The customer pays the owners of the host websites for displaying the campaign in exactly the same manner that he would pay a newspaper or magazine publisher for displaying a campaign. The invention allows the customer to determine how many unique visitors are exposed to the campaign from each host website, thus allowing him to assess whether it is financially worthwhile to display the campaign in all of the host websites or whether sufficient coverage will be achieved by a reduced number of host websites, thus saving costs.

To this end the campaign advertisements are served by an ad server (not shown) that maintains a list of source URLs of each advertisement, whose (ad server's) link is embedded in the host web page in known manner by means of HTML tags. When a web user opens that web page, a call is made to the ad server, which further calls the appropriate URL of the advertisement to be displayed.

Within the call to the ad server, a call is made also to the overlap server 14. When a web user enters the web page, thus displaying the ad on the web user's computer, the HTML tag calls the overlap server 14 thereby establishing brief connection between the web user's computer and the overlap server 14. During the brief connection thus established, the overlap server 14 is able to store a cookie on the web user's computer that is unique to the overlap server 14 and identifies the web user, since it is stored on his or her computer. Likewise, if the cookie already exists, the overlap server 14 is able to edit it on the web user's computer. The cookie is formatted to allow the overlap server 14 to identify a specific campaign as well as each host website through which the user was exposed to the campaign. Thus using the cookie, the overlap server 14 is able to determine whether the web user to whom the cookie belongs (i.e. on whose computer the cookie is stored) has been previously exposed to the currently identified campaign. A suitable cookie structure is described below by way of non-limiting example.

Additionally, the overlap server 14 maintains a database 15 that is structured to allow direct determination of the cumulative number of different web users exposed to n different websites ($S_1, S_2 \ldots S_N$). For each ad campaign, the database 15 maintains a number of separate records for each of the n websites and for each unique combination of websites, i.e. each unique combination of two websites, each unique combination of three websites, and so on. It is easy to show that the number of unique combinations of k websites out of a total of n websites is:

$$\frac{n!}{(n-k)!k!}$$

Consider, by way of example, an advertising campaign where an ad is displayed on four different websites, A, B, C and D. A user can visit any one of these websites only, or he may visit any two the websites, or any three the websites, or he may visit all four websites. It is easy to tabulate the combinations of possible websites as shown in Table I below:

TABLE I

| Series | Combinations | Formula | Σ |
|---|---|---|---|
| Single | A, B, C, D | $\frac{4!}{(4-1)!1!}$ | 4 |
| Double | AB, AC, AD, BC, BD, CD | $\frac{4!}{(4-2)!2!}$ | 6 |
| Triple | ABC, ABD, ACD, BCD | $\frac{4!}{(4-3)!3!}$ | 4 |
| Quad | ABCD | | 1 |

Thus, in general the maximum number of records that must be maintained in the database for an ad campaign displayed on n different websites where the order of visiting the sites is not important is given by:

$$\sum_{k=1}^{n-1} \frac{n!}{(n-k)!k!} + 1$$

If the order of visiting the sites is important, then records must be maintained in the database for each permutation, rather than merely for each combination. It is easy to tabulate the permutations of possible websites as shown in Table II below:

TABLE II

| Series | Permutations | Formula | Σ |
|---|---|---|---|
| Single | A, B, C, D | $\frac{4!}{(4-1)!}$ | 4 |
| Double | AB, BA, AC, CA, AD, DA, BC, CB, BD, DB, CD, DC | $\frac{4!}{(4-2)!}$ | 12 |
| Triple | ABC, ACB, BAC, BCA, ABD, ADB, BAD, BDA, ACD, ADC, CAD, CDA | $\frac{4!}{(4-3)!}$ | 12 |
| Quad | ABCD, ABDC, ACBD, ACDB . . . | 4! | 24 |

Thus, in general the maximum number of records that must be maintained in the database for an ad campaign displayed on n different websites where the order of visiting the sites is important is given by:

$$\sum_{k=1}^{n-1} \frac{n!}{(n-k)!} + n!$$

In either case, it is clear that the number of records that must be maintained in the database 15 for any given advertising campaign is a determinate function of the number of websites participating in the campaign and can thus be configured when the campaign is set up. Clearly this data can be maintained by other means such as memory, flat files, etc. and reference to database is non-limiting. It should also be noted that some embodiments of the invention allow records to be added to the database 15 on-the-fly as required.

Figure 2:
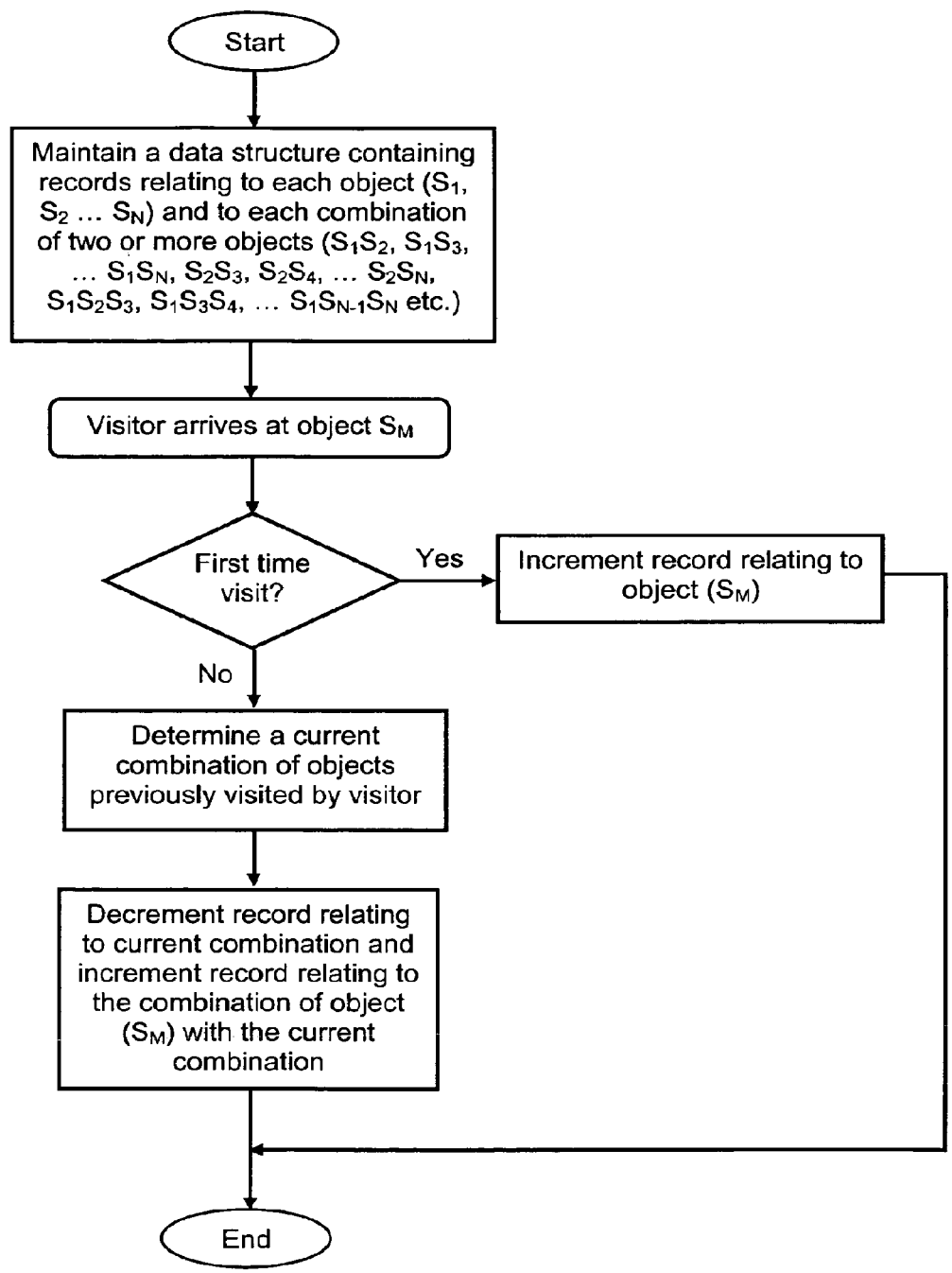
FIGS. 2 and 3 are flow diagrams showing the principal operations carried out by an overlap server in the system shown in FIG. 1 in accordance with different embodiments of the invention.
Figure 3:
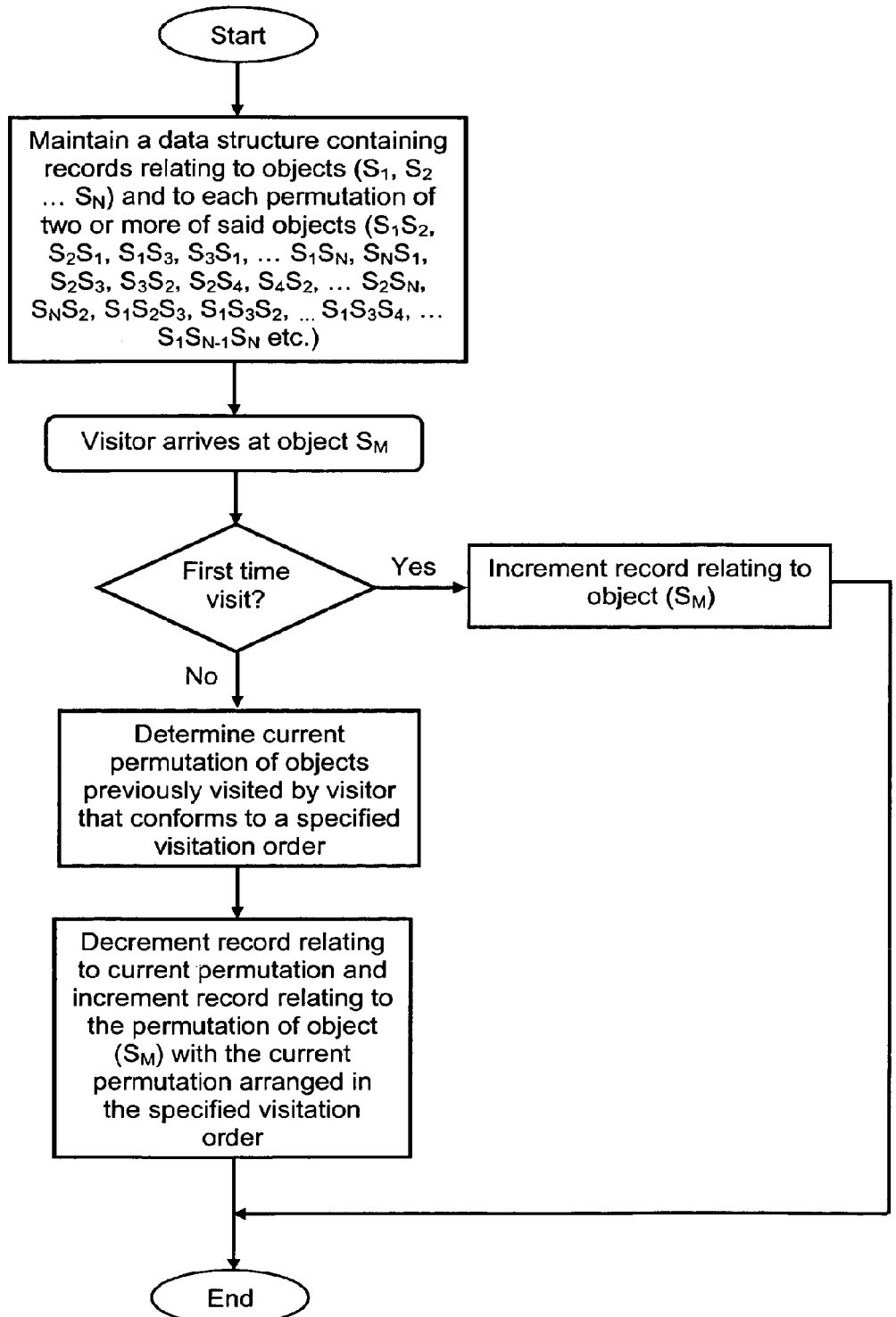

FIGS. 2 and 3 are flow charts that show the principal operations carried out by the overlap server 14 in accordance with two different embodiments of the invention. In the first embodiment depicted in FIG. 2, order of visitation is unimportant, while the second embodiment depicted in FIG. 3 takes order of visitation into consideration. Since both methods share a common basis, the embodiment shown in FIG. 2 will first be described in detail and later supplementary details will be provided of the slight differences required to implement the second embodiment depicted in FIG. 3.

When a web user 11 enters into a website displaying a campaign advertisement that calls the overlap server 14, brief communication is established between the overlap server 14 and the web user's computer. During the brief communication thus established, the overlap server 14 checks whether a cookie belonging to the overlap server 14 is stored on the web user's computer. If so, the overlap server 14 reads the cookie in order to determine whether this particular web user has been previously exposed to the campaign displayed in the currently accessed web page. As will be explained below, this requires that each campaign has a unique ID that is encoded within the cookie. If the cookie does not contain the ID of the current campaign, this means that this is the first time that the web user has been exposed to the campaign and the database record corresponding to the website currently accessed by the web user is incremented by 1. The cookie is likewise updated to reflect the ID of the website via which the web user was exposed to the campaign.

On the other hand, if the cookie does contain the ID of the current campaign, this means that the web user was already exposed to the campaign. In this case, he may have accessed the same website previously and/or he may have accessed a different website participating in the ad campaign. Which of these two scenarios is applicable is also encoded within the cookie. Thus, by way of simple example, a multi-bit binary website overlap code may be stored in the cookie, wherein the number of bits is equal to the number of websites participating in the ad campaign and wherein each bit is initially zero and it set to 1 when the corresponding website is visited by the web user. Thus, by parsing the binary representation of the site overlap code each bit provides an indication as to whether or not the corresponding website were visited by the web user. There are, of course, other ways than binary to encode the site data, and a different encoding scheme is presented in greater detail below.

Based on the site overlap code, the database is now updated as follows. First, the site overlap code shows which websites have been previously visited by the web user. Specifically, before the site overlap code is updated by setting the corresponding bit to 1, the site overlap code shows the current combination of websites in the present campaign that have been visited by the current web user. This allows direct translation to a unique database record. Thus referring again, to Table I, if websites A and D were previously visited, this translates to a unique database record entry whose value is set to the cumulative number of unique (i.e. unrepeated) visitors who have visited both A and D but no other websites in the campaign. If the current website is A or D then, of course, the corresponding bit in the site overlap code within the cookie will already be 1; and in this case no further action is required. On the other hand, if the current website is B or C then the corresponding bit in the site overlap code within the cookie will be 0; and in this case the following actions are required. First, the database record corresponding to the current site overlap code (before it is updated) i.e. "AD" is decremented by 1 and the database record corresponding to the new site overlap code (after updating) i.e. "ABD" or "ABC" (as appropriate) is incremented by 1. The site overlap code is also, of course, updated to show that the current user also visited site B or C.

It will thus be apparent that the site overlap code always provides an indication as to the current combination of websites visited by any given identifiable user, while the database 15 provides an indication as to the cumulative number of visits to each combination of websites participating in the ad campaign. Thus, in the simple example shown in Table 1, the database shows the cumulative number of visits to A, B, C, D on their own; to the double combinations AB, AC, AD, BC, BD, CD; to the triple combinations ABC, ABD, ACD, BCD and to the quad combination ABCD. Suppose that the record corresponding to AB is the same or very close in value to the record corresponding to ABCD. This would imply that the added cost benefit of displaying the campaign on websites C and D is probably not warranted since the same or significantly the same exposure is provided by displaying the campaign on websites A and B alone—and, of course, for much less cost. Likewise, if one of websites, say A, on its own is dominant so that all combinations containing A show significantly more visits than combinations not containing A, this may imply a cost-effective ad campaign can be realized by advertising on website A alone.

The above description assumes that the order of visiting websites is not important so that it does not matter whether the web user arrived at website B after first surfing A and then D or whether he first surfed D and then A and only then arrived at B. And, of course, once the cookie is updated, all that is known is that the web user surfed A, D and B there being no way to determine in which order he visited these websites. However, there may be occasions where the order in which the web user surfs the websites is important. For example, suppose in the above embodiment, it emerges that the dominant combination is AD suggesting that the ad campaign is effective even if the campaign is displayed on websites A and D only. This would require that the customer pays two websites A and D for the right to display the campaign on their websites.

But suppose now that the order in which the websites are visited is also recorded. This gives valuable additional information since if web users predominantly visit A before visiting D, this would imply that an effective ad campaign can be realized by displaying the campaign on A only. Thus, in such an application order may be significant but it will be understood that this may not necessarily be true in other applications. For example, suppose an on-line museum wishes to assess which artifacts or exhibits are most popular with the object of exhibiting more artifacts in those exhibits that are popular at the expense of those that are rarely visited. In this case, order may not be significant and the desired information can be determined by configuring the database so as to store records for each combination of artifacts visited—or, more likely, for each combination of exhibits. So, for example, if the curator of an on-line museum wishes to determine in which exhibit visitors are most interested among dinosaurs, anthropology and paleontology then each artifact may be encoded so as to identify the corresponding field (e.g. prehistory, anthropology, paleontology etc.) and a cookie stored on the computer of each on-line visitor may encode the relevant overlap data, as described above.

Order is of interest in the event that, for example, for a given campaign there are two dominantly visited websites, and the advertiser wishes to find out whether one of these websites is typically visited earlier, to the effect that by advertising only there the advertiser would gain substantially the same exposure and earlier in time.

Having described the principles of the invention, we will now describe various implementations it being understood that these are by way of example only.

Representation in the Cookie

The overlap server maintains in the cookie a list of the sites the user has visited per campaign. This list can be saved in one of the following ways:
Site ID List
The cookie holds a list of site IDs separated by a delimiter, allowing the sites to be in any order.
For example: site1;site2;site3.
Site Bit List
A sequence of bits represents the list of sites participating in a campaign. Each site is represented by a bit indicating if this site were visited, 1, or not, 0. The location of each bit in the sequence of bits is according to the ordinal number of the site in the database. Site 1 is bit 1, Site 12 is bit 12 and so on.
For Example:
In a specific implementation, room for 40 sites is reserved in the cookie. A sequence of 40 bits represents a binary number between 0 and $2^{40}-1$. This binary number can be represented in base 62 as a 7 characters string with preceding zeros.
Defining the LSB as the first site makes the calculation easier.
For a campaign with 4 websites all of whose websites were visited the binary number will be, looking at the bits sequence from right to left, 000 . . . 0001111, which is 15. 15 in base 62 is F so in the string that will be written in the cookie is 000000F.

Overlap Server Database

The overlap server 14 needs to update the cookie with the sites that a user visited. In order to do this, each site in the campaign has to get a unique ordinal number. This number is accessed by the overlap server 14 and is used to determine what bit corresponds to a specific site participating in a campaign and, given a web user's exposure to a campaign, should be changed from 0 to 1. To this end, the unique ordinal number of each campaign may be stored in the database 15 or in any other file or database that is accessible to the overlap server 14.

Table III below is built for a configuration embracing 3 sites: A, B, C

TABLE III

| Combination | Unique Users |
|---|---|
| Only A | |
| Only B | |
| Only C | |
| A + B | |
| A + C | |
| B + C | |
| A + B + C | |

This table also facilitates calculation of the current reach and frequency, since summing only A with A+B and A+C and A+D and A+B+C and A+B+C+D gives the cumulative number of unique users who have visited website A since the start of the campaign.

If the order of the sites is important as well, a larger table is required as shown below in Table IV, which allows determination of how many users visited site A and then visited site B as opposed to users that first visited site B and then site A. For example for sites A,B,C:

TABLE IV

| Combination | Unique |
|---|---|
| Only A | |
| Only B | |
| Only C | |
| A + B | |
| A + C | |
| B + A | |
| B + C | |
| C + A | |
| C + B | |
| A + B + C | |
| A + C + B | |
| B + A + C | |
| B + C + A | |
| C + A + B | |
| C + B + A | |

In order for the overlap server 14 to keep track of the order in which websites are visited not only must there be order-dependent records in the database 15, but also the cookie must be configured to be order-sensitive. To this end, the cookie is configured to contain a sequence of data cells. Upon a web user's exposure to a campaign ad in a certain website, the overlap server writes an identifier of the site ID in the subsequent data cell. Thus if that user visited websites e.com, f.com, i.com in that order, the cookie will at that point display the following sequence: e.com identifier, f.com identifier, i.com identifier. The number of data cells required is the number of the websites participating in the campaign.

The potential maximum number of rows in the table for n sites will be:

$$\sum_{k=1}^{n-1} \frac{n!}{(n-k)!} + n!$$

In accordance with one embodiment, the overlap server database contains fields only for the combinations/permutations that actually exist in reality, i.e., if no web users actually visited the combinations/permutations of, for example, websites BCD, then there would be no such line at all in the overlap server database for this combination/permutation. In such an embodiment the database structure is updated on the fly by adding new rows to the appropriate database tables as required. Alternatively, all possible relevant fields can be allocated in advance: although this will be wasteful of memory if it turns out that not all combinations/permutations were actually visited.

If the cookie holds the sites as bits then a table having the general structure of the table header shown below in Table V should exist:

TABLE V

| website bit | website ID | Campaign ID |
|---|---|---|

For each website that is added an increased ordinal number should be added that will specify its location in the list of websites.

Representation in the Log

In accordance with one embodiment, updating the database 15 is done by means of a log. A new entry to the log must be written for each new site that the user visited. The log contains the following information in each entry (line):
Date
Campaign ID
The existing state—the list of sites the user has visited till now i.e. prior to the log being accessed
The updated state—the updated list of sites the user has visited. Actually this is the existing state plus the new site.

Implementation

A particular implementation of the algorithm will now be described.

The cookie stores the sites on which the user saw the campaign. The overlap server 14 checks the user's cookie and for the sake of explanation determines that the user already saw the campaign on sites A, B and C. In one embodiment of the invention, the overlap server 14 maintains a log of all changes that need to be made to the database 15, but does not itself update the database. Instead, it conveys the log to a data ware-house (not shown) which maintains the integrity of the database 15. If the user now sees the campaign on one of these sites, no unique user should be added to a new combination and the overlap server 14 therefore takes no further action. However if the user saw the campaign on site D, then the overlap server 14 marks in the log that:
1 unique user should be removed from the combination A+B+C
1 unique user should be added to the combination A+B+C+D The data warehouse receives the log and updates the database tables accordingly. Remote updating of the database 15 by the data warehouse offloads the need to do so from the overlap server 14 and avoids the need for the overlap server 14 to make repeated connections to the database. However, it will be appreciated that the invention also contemplates the possibility to update the database 15 by the overlap server 14.

Figure 4:
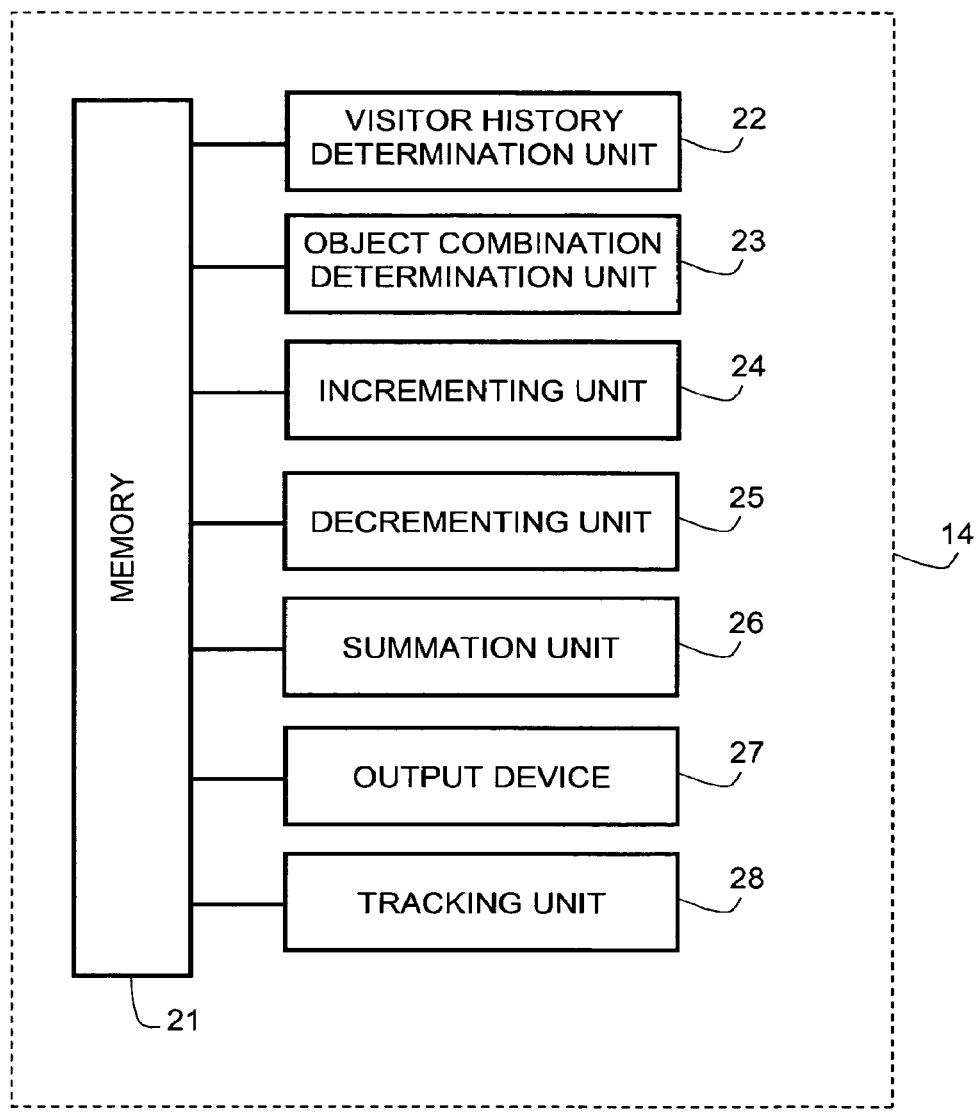
FIG. 4 is a block diagram showing functionality of the overlap server in accordance with an embodiment of the invention.

FIG. 4 is a block diagram showing functionality of the overlap server 14 in accordance with the first embodiment of the invention. As shown, the overlap server 14 comprises a memory 21 for storing a data structure containing records relating to each of the objects ($S_1, S_2 \ldots S_N$) and to each combination of two or more objects ($S_1S_2, S_1S_3, \ldots S_1S_N, S_2S_3, S_2S_4, \ldots S_2S_N, S_1S_2S_3, S_1S_3S_4, \ldots S_1S_{N-1}S_N$ etc.). A visitor history determination unit 22 is coupled to the memory 21 for determining whether a visitor is visiting an object ($S_M$) for the first time. An object combination determination unit 23 is coupled to the memory 21 for determining a current combination of objects previously visited by the visitor. An incrementing unit 24 coupled to the object combination determination unit 23 and to the memory 21 and is responsive to the current combination being null for incrementing a respective record relating to said object ($S_M$). A decrementing unit 25 is coupled to the object combination determination unit 23 and to the memory 21 and is responsive to the current combination being non-null for decrementing the record relating to the current combination and incrementing the record relating to the combination of the object ($S_M$) with the current combination. An optional summation unit 26 is coupled to the memory 21 and adapted to calculate a total number of unique visitors to a specific object ($S_M$) by summing respective values stored in all records of the database 15 relating to the object ($S_M$). An optional output device 27 may be provided for outputting data subsisting in the data structure. Likewise, an optional tracking unit 28 allows for tracking changes in the visitor distribution and objects overlap over time, typically by comparing between two or more data states obtained from the data structure at different times.

Similar hardware is employed for implementing the second embodiment where order of visitation is important. The main differences are as follows. The data structure contains records relating to each of the objects ($S_1, S_2 \ldots S_N$) and to each permutation of two or more of objects ($S_1 S_2, S_2 S_1, S_1 S_3, S_3 S_1, \ldots S_1 S_N, S_N S_1, S_2 S_3, S_3 S_2, S_2 S_4, S_4 S_2, \ldots S_2 S_N, S_N S_2, S_1 S_2 S_3, S_1 S_3 S_2, \ldots S_1 S_3 S_4, \ldots S_1 S_{N-1} S_N$ etc.). The object combination determination unit 23 is adapted to determine a current permutation of objects previously visited by the visitor that conforms to a specified visitation order. The incrementing unit 24 is responsive to the current permutation being null for incrementing a respective record relating to the object ($S_M$); and the decrementing unit 25 is responsive to the current permutation being non-null for decrementing the record relating to the current permutation and incrementing the record relating to the permutation of the object ($S_M$) with the current permutation arranged in the specified visitation order.

In all cases, the data structure may be pre-compiled to contain all records in a complete set of records relating to all possible combinations or permutations. Alternatively, the incrementing unit 24 may be configured to create records in the data structure on-the-fly, possibly even starting from an initially empty data structure.

While a number of different embodiments have been described, it will be appreciated that modifications can be made without departing from the scope of the appended claims. For example, although the invention is principally applicable to determining the number of unique visitors to a site, it is also possible with minor modification to compute repetitions too. This could be achieved, for example, by allocating additional fields in the database, such as ABC and a separate line for ABCC. Such an approach would clearly require that the database tables be updated on the fly.

For example, the invention allows for real-time monitoring of visitor distribution and objects overlap. Whenever required, the then-current data subsisting in the data structure may be drawn and viewed in any one of a number of feasible implementations, including but not limited to a web-based reporting system, a reporting email, etc.

Further, as noted above, the invention allows for tracking of changes in the visitor distribution and objects overlap over time. By drawing then-current data from the data structure and comparing between two or more such data states obtained at different times, trends and other information may be derived from the comparison.

Likewise, while an embodiment has been described with particular reference to site reach in an on-line ad campaign, it will be appreciated that similar principles can be utilized in other applications. One example has been suggested above for use in an on-line museum to allow the curator to assess which artifacts or exhibits are most popular with the object of exhibiting more artifacts in those exhibits that are popular at the expense of those that are rarely visited.

However, the museum does not have to be an on-line museum since the same principles can be applied to a conventional exhibition. For example, an entry barrier to each exhibit can be equipped with a contactless reader and each visitor can be provided with a contactless tag having a unique ID, so that when each visitor visits a new exhibit his identity can be read by the corresponding reader. A database can be configured so as to store records for each combination of exhibits visited and updated in a manner analogous to that described above for on-line visits.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

In the method claims that follow, Roman numerals used to designate claim operations are provided for convenience only and do not dictate any particular order of performing the operations.

Finally, it should be noted that the word "comprising" as used throughout the appended claims is to be interpreted to mean "including but not limited to".

The invention claimed is:

1. A system for tracking a cumulative number of unique visitors to different objects, comprising:
    a storage device for maintaining a data structure that allows direct determination of the cumulative number of different visitors exposed to the different objects and for maintaining a number of separate unique database records as a number of unique combinations of objects, wherein each unique database record designates a unique combination of visited objects and a number of unique unrepeated visits, the objects being different websites displaying a same set of advertisements of a same campaign;
    an advertisement (ad) server for maintaining a list of source URLs of the different objects, wherein each of the different objects can be visited by the multiple visitors, wherein the ad server, upon receiving a request from a visitor to visit an object, serving a source URL of an object and establishing a connection between an overlap server and a visitor; and
    an overlap server for examining a cookie stored in the visitor during the established connection, for determining whether the visitor previously visited the currently requested object associated with the source URL to be served and a current permutation of objects previously visited by the visitor that conforms to a specified visitation order, and for updating the data structure in the storage device and the cookie based on the examination result of the cookie.

2. The system of claim 1, wherein the cookie includes an overlap code which designates each of the objects, and for each object further designates if the visitor holding the cookie was previously visited by the visitor.

3. The system of claim 2, wherein the overlap code is a multi-bit binary code, wherein the number of bits is equal to the number of objects, and each bit is associated with one object, wherein each bit is initially set to 0, and set to 1 when a corresponding object is visited by the visitor holding the cookie.

4. The system of claim 2, wherein the overlap server is further configured to store a new cookie in the visitor, if a cookie that is not stored therein.

5. The system of claim 2, wherein the overlap server is further configured to: parse the overlap code to determine whether the currently requested object was previously visited by the visitor; if the currently requested object was not previously visited by the visitor then, derive information about the current combination of objects visited by the visitor; translate the derived information to a unique database record in the data structure corresponding to the current combination of objects visited by the visitor; and decrement a number of unique visits to the unique database record corresponding to the current combination of objects.

6. The system of claim 5, wherein the currently requested object was not previously visited by the visitor, the overlap server is further configured to: update the overlap code to indicate that the currently requested object is visited, thereby creating a new combination of objects in the overlap code; translate the new combination of objects to a unique database record in the data structure corresponding to the new combination of objects; and increment a number of unique visits in the unique database record corresponding to the new combination of objects.

7. The system of claim 1, the system is further configured: to determine an order of visiting the different objects based on a permutation of the objects previously visited by each of the visitors.

8. The system of claim 7, wherein the storage device is further configured to maintain a number of separate unique database records as a number of permutations of the objects previously visited by each of the visitors, wherein each unique database record designates a unique permutation of visited objects and a number of unique unrepeated visits.

9. The system of claim 7, wherein the overlap server is further configured to: parse an overlap code stored in the cookie to determine whether the currently requested object was previously visited by the visitor, derive information about the current permutation of objects visited by the visitor; translate the derived information into a unique database record in the data structure corresponding to the current permutation of objects visited by the visitor; and decrement a number of unique visits in the unique database record corresponding to the current permutation of objects.

10. The system of claim 9, wherein when the currently requested object was not previously visited, the visitor in the overlap server is further configured to: update the overlap code to indicate that the requested object is visited, thereby creating a new permutation of objects visited by the visitor holding the cookie; translate the new permutation of objects into a unique database record in the data structure corresponding to the new permutation of objects; and increment a number of unique visits in the unique database record corresponding to the new permutation of objects.

11. The system of claim 1, wherein the overlap server, the visitors, and the ad server are connected through a network, wherein each visitor includes a web browser.

12. The system of claim 1, wherein the storage device is integrated in the overlap server.

13. A method for tracking a cumulative number of unique visitors to different objects, comprising:
maintaining a data structure that allows for a direct determination of the cumulative number of different visitors exposed to the different objects;
establishing a connection with a visitor when the visitor requests to visit an object;
examining a cookie stored in the visitor during the established connection to determine whether the visitor previously visited the currently requested object; and
updating the data structure in a database and an overlap code contained in the cookie based on the examination results, the database maintains a number of separate unique database records as a number of unique combinations of objects, wherein each unique database record designates a unique combination of a visited object, a number of unique unrepeated visits, and a current permutation of objects previously visited by the visitor that conforms to a specified visitation order, wherein the objects are different websites displaying a same set of advertisements of a same campaign.

14. The method of claim 13, further comprising:
parsing the overlap code in the cookie to determine whether the currently requested object was previously visited by the visitor, wherein the overlap code designates each of the objects, and for each object further designates if a visitor holding the cookie previously visited the object; and
if the currently requested object was not previously visited by the visitor, deriving information about the current combination of objects visited by the visitor from the parsed overlap code;
translating the derived information to a unique database record in the data structure corresponding to the current combination of objects visited by the visitor; and
decrementing a number of unique visits in the unique database record corresponding to the current combination of objects.

15. The method of claim 14, wherein the currently requested object was not previously visited, further comprising: updating the overlap code to indicate that the currently requested object is visited, thereby creating a new combination of objects; translating the new combination of objects to a unique database record in the data structure corresponding to the new combination of objects; and incrementing the number of unique visitors in the unique database record corresponding to the new combination of objects.

16. A method for tracking a cumulative number of unique visitors to different objects and an order of visiting the different objects, comprising:
maintaining a data structure that allows for a direct determination of the cumulative number of different visitors exposed to the different objects that conforms to a specified visitation order, the data structure including a number of separate unique database records as a number of permutations of the objects previously visited by each of the visitors, wherein each unique database record designates a unique permutation of visited objects and a number of unique visits for the corresponding permutation;
establishing a connection with a visitor when the visitor requests to visit an object;
examining a cookie stored in the visitor during the established connection to determine whether the visitor previously visited the currently requested object and to further determine the visitation order of the currently requested object with respect to other objects; and
updating the data structure in the database and an overlap code contained in the cookie based on the examination results, wherein the objects are different websites displaying a same set of advertisements of a same campaign.

17. The method of claim 16, further comprising:
parsing an overlap code stored in a cookie to determine whether the currently requested object was previously visited by the visitor, wherein the overlap code maintains a current permutation of objects previously visited by the visitor that conforms to a specified visitation order; and
if the currently requested object was not previously visited by the visitor, deriving information about the current permutation of objects visited by the visitor;

translating the derived information into a unique database record in the data structure corresponding to the current permutation of objects visited by the visitor; and decrementing a number of unique visits in the unique database record corresponding to the current permutation of objects.

18. The method of claim 17, wherein when the currently requested object was not previously visited, further comprising: updating the overlap code to indicate that the requested object is visited; translating the new permutation of objects derived from the updated overlap code to a unique database record in the data structure corresponding to the new permutation of objects; and incrementing the unique database record corresponding to the new combination of objects.

* * * * *